(12) United States Patent
Le Nir et al.

(10) Patent No.: US 7,933,564 B2
(45) Date of Patent: Apr. 26, 2011

(54) METHOD FOR THE MULTI-ANTENNA TRANSMISSION OF A LINEARLY-PRECODED SIGNAL, CORRESPONDING DEVICES, SIGNAL AND RECEPTION METHOD

(75) Inventors: Vincent Le Nir, Flers (FR); Maryline Helard, Rennes (FR); Alban Goupil, Rennes (FR)

(73) Assignee: France Telecom, Paris (FR)

( * ) Notice: Subject to any disclaimer, the term of this patent is extended or adjusted under 35 U.S.C. 154(b) by 690 days.

(21) Appl. No.: 10/581,236

(22) PCT Filed: Dec. 2, 2004

(86) PCT No.: PCT/FR2004/003107
§ 371 (c)(1),
(2), (4) Date: Dec. 24, 2008

(87) PCT Pub. No.: WO2005/057838
PCT Pub. Date: Jun. 23, 2005

(65) Prior Publication Data
US 2009/0117862 A1 May 7, 2009

(30) Foreign Application Priority Data
Dec. 4, 2003 (FR) .................................. 03 14272

(51) Int. Cl.
*H04B 7/02* (2006.01)
(52) U.S. Cl. .................. 455/101; 375/267; 375/295
(58) Field of Classification Search .............. 455/91, 455/101, 103, 110, 550.1, 562.1, 277.1, 277.2; 375/259, 260, 267, 347, 295, 296
See application file for complete search history.

(56) References Cited

U.S. PATENT DOCUMENTS

| | | | | |
|---|---|---|---|---|
| 7,440,510 | B2 * | 10/2008 | Sandhu et al. | 375/267 |
| 7,742,390 | B2 * | 6/2010 | Mujtaba | 375/267 |
| 2003/0185310 | A1 | 10/2003 | Ketchum et al. | 375/259 |
| 2008/0096488 | A1 * | 4/2008 | Cho et al. | 455/101 |

OTHER PUBLICATIONS

Written Opinion of counterpart foreign application No. PCT/FR2004/003107 filed Dec. 2, 2004.
European Search Report of counterpart foreign application No. PCT/FR2004/003107 filed Dec. 2, 2004.
Liu Z. et al., "Space-time coding for broadband wireless communications", vol. 1, No. 1, Jan. 2001.
Foschini, "Layered Space-Time Architecture for Wireless Communication in a Fading Environment When Using Multiple Antennas", Bell Laboratories Technical Journal, vol. 1,No. 2, Autumn, 1996, pp. 41-59.

(Continued)

*Primary Examiner* — Thanh C Le
(74) *Attorney, Agent, or Firm* — David D. Brush; Westman, Champlin & Kelly, P.A.

(57) ABSTRACT

An embodiment of invention relates to a method for the transmission of a signal formed by vectors, each vector comprising N source symbols to be transmitted, using M transmission antennas, wherein M is greater than or equal to 2. The method comprises the following steps: linearly precoding the signal using a matrix product of a source matrix formed by vectors that are organized in successive lines by a linear precoding matrix, delivering a precoded matrix; and successively transmitting precoded vectors corresponding to columns of said precoded matrix, the M symbols of each precoded vector being distributed to the M antennas.

13 Claims, 4 Drawing Sheets

OTHER PUBLICATIONS

Wolniansky et al.,"V-BLAST: An Architecture for Realizing Very High Data Rates Over the Rich-Scattering Wireless Channel", Proc. ISSSE-98, Pisa, Italy, Sep. 29, 1998.

Baro et al., "Improving BLAST Performance using Space-Time Block Codes and Turbo Decoding", Globecom 2000, Nov. 2000.

Ma et al., "Full Diversity Full-Rate Complex-Field Space-Time Coding", IEEE Transactions on Signal Processing 2003.

Le Nir V. et al., "Reduced-complexity space-time block coding and decoding schemes with block linear precoding", Electronics Letters; IEE Stevenage, GB, vol. 39, No. 14, Jul. 10, 2003.

* cited by examiner

METHOD FOR THE MULTI-ANTENNA TRANSMISSION OF A LINEARLY-PRECODED SIGNAL, CORRESPONDING DEVICES, SIGNAL AND RECEPTION METHOD

CROSS-REFERENCE TO RELATED APPLICATION

This Application is a Section 371 National Stage Application of International Application No. PCT/FR2004/003107, filed Dec. 2, 2004 and published as WO 2005/057838 on Jun. 23, 2005, not in English.

FIELD OF THE DISCLOSURE

The field of the disclosure is that of wireless digital communications. More specifically, the disclosure relates to the sending/reception of a signal that implements a precoding matrix in a MIMO ("Multiple Input Multiple Output") type multi-antenna system also called a "BLAST" (Bell Laboratories Layered Space-Time") system.

One or more embodiments of the invention can be applied in the field of radio communications, especially for systems of the third, fourth and subsequent generations.

BACKGROUND

Several sending/reception systems, comprising multiple antennas are already known. Some of the systems use space-time encoding by which their spatial/temporal diversity can be exploited with the utmost efficiency. However, the spectral efficiency of these space-time codes is limited.

Certain research work then led to the study of layered space-time (LST) systems using spatial multiplexing techniques to obtain systems whose capacity increases linearly with the number of transmit and receiver antennas.

Thus Foschini, in "Layered Space-Time Architecture for Wireless Communication in a Fading Environment When Using Multiple Antennas" (Bell Laboratories Technical Journal, Vol. 1, No. 2, Autumn, 1996, pp. 41-59) presented a first space multiplexing system aimed at augmenting the capacity of transmission systems. To this end, he described a diagonal "BLAST" structure (known as D-BLAST) in which the coded or non-coded and interleaved symbols of each layer are transmitted successively by each of the transmit antennas.

Wolniansky, Foschini, Golden and Valenzuela, in "V-BLAST: An Architecture for Realizing Very High Data Rates Over the Rich-Scattering Wireless Channel" (Proc. ISSSE-98, Pisa, Italy, Sep. 29, 1998), subsequently simplified this technique by modifying the architecture of the initial "BLAST" system into a vertical system ("V-BLAST") without encoding, and by using an interference cancellation algorithm at reception with a zero forcing (ZF) criterion. This vertical architecture quite simply proceeds from a demultiplexing of the chain of information into sub-chains, each of them being transmitted by its respective antenna.

Subsequently, Baro, Bauch, Pavlic and Semmler ("Improving BLAST Performance using Space-Time Block Codes and Turbo Decoding", Globecom 2000, November 2000) envisaged the combination of the space-time codes and turbo-decoding with codes V-BLAST type systems.

Finally, Ma and Giannakis ("Full-Diversity Full-Rate Complex-Field Space-Time Coding", IEEE Transactions on Signal Processing 2003) presented a technique combining linear precoding with MIMO techniques of spatial multiplexing at the time of sending. In this technique, linear precoding is done by the use of particular precoding matrices based on Vandermonde matrices, the different symbols at the time of sending being sent cyclically. The decoding in reception is done according to a maximum likelihood detector.

A first drawback of the "BLAST" technique of spatial multiplexing proposed by Foschini is its decoding complexity.

Another drawback of this technique, which was subsequently changed into the "V-BLAST" technique, is that the maximum spatial diversity of the systems is not exploited.

As for the technique envisaged by Baro, Bauch, Pavlic and Semmler, which consists in combining the space-time codes with the V-BLAST system, it has the drawback of not exploiting the maximum capacity of the system.

Furthermore, the different prior art techniques cannot be used to process correlated channels.

These different drawbacks are partially resolved by the technique of Ma and Giannakis, which can be used to exploit both the space-time diversity of the systems, by means of linear precoding, and their maximum capacity.

However, a major drawback of this technique is the receiver used, which must be of the maximum likelihood (abbreviated as ML) type. These ML receivers are complex to implement and, owing to their complexity, limit the size of the precoding matrix to the number of transmit antennas of the system.

SUMMARY

An embodiment of the invention is directed to a method for the sending of a signal formed by vectors, each vector comprising N source symbols to be sent, and implementing M transmit antennas where M is greater than or equal to 2.

According to an embodiment of the invention, a linear precoding is performed on said signal, implementing a matrix product of a source matrix, formed by said vectors organized in successive rows, by a linear precoding matrix, delivering a precoded matrix, then precoded vectors corresponding to columns of the precoded matrix are sent successively, the M symbols of each precoded vector being distributed over the M antennas.

Thus, an embodiment of the invention relies on a wholly novel and inventive approach to the sending of a signal, implementing linear precoding in a multi-antenna system.

More specifically, an embodiment of the invention proposes to carry out a transposed space-time mapping, i.e. it proposes to send the symbols having undergone the same precoding by column on the M antennas.

This approach therefore differs sharply from the cyclical sending proposed by Ma and Giannakis, which induced high complexity at reception.

The technique of an embodiment of the invention is particularly advantageous because it can be used to exploit the maximum capacity of the MIMO channel, given that it does not use space-time codes, and maximum space-time diversity, through the linear precoding.

The number M of transmit antennas corresponds to the number of vectors to be sent, these vectors forming the different rows of the source matrix.

Advantageously, the precoding matrix of such a sending method is a block matrix.

Preferably, the precoding matrix is a unitary matrix having a size greater than or equal to M.

Thus, an embodiment of the invention is distinguished from prior art techniques since the size of the precoding matrix is not always equal to the number M of transmit antennas. As shall be seen here below in this document, this is made possible according to an embodiment of the invention through the implementation of a decoding operation of low complexity that therefore enables simple decoding even with large precoding matrices.

This precoding matrix belongs to the group comprising the Hadamard matrices, special unitary matrices sized 2×2, also written as SU(2), Fourier matrices, Vandermonde matrices and, more generally, unitary matrices.

In one advantageous embodiment of the invention, the precoding matrix is a block matrix having the form:

$$\Theta_L = \sqrt{\frac{2}{L}} \cdot \begin{bmatrix} \Theta_{L/2} & \Theta_{L/2} \\ \Theta_{L/2} & -\Theta_{L/2} \end{bmatrix}^T$$

with $\Theta_2 = \begin{bmatrix} e^{i\theta_1}\cos\eta & e^{i\theta_2}\sin\eta \\ -e^{-i\theta_2}\sin\eta & e^{-i\theta_1}\cos\eta \end{bmatrix}$ and $\eta = \frac{\pi}{4} + k\frac{\pi}{2}$, $\theta_2 = \theta_1 - \frac{\pi}{2}$, and for $i \in [1,2]$, $$\theta_i = \frac{\pi}{4} + k'\frac{\pi}{2}$$

where k, k' are relative integers.

An embodiment of invention also relates to a method for the reception of a signal sent on M transmit antennas where M is greater than or equal to 2, implementing P receiver antennas, where P greater than or equal to 2.

According to an embodiment of the invention, reception vectors are received on the P antennas and are distributed by columns in a reception matrix, the P symbols of a reception vector being distributed on the P antennas. The method then implements an operation for processing the reception matrix, comprising a step of multiplication by a linear de-precoding matrix representing a linear precoding matrix used at sending, so as to obtain a de-precoded matrix by which it is possible to extract an estimation of the source symbols sent.

It shall be noted that, for optimal reception, the number P of antennas in reception is greater than or equal to the number M of transmit antennas.

Herein and throughout the rest of the document, the term "de-precoding" is understood to mean an operation that is substantially the reverse of the precoding operation performed at the sending stage.

In a first embodiment, the de-precoding matrix is the conjugate transpose matrix of the precoding matrix.

In this case, with the sent signal being conveyed between the M transmit antennas and the P receiver antennas by a transmission channel, the reception matrix is multiplied, during the processing operation, by a matrix representing the inverse of the transmission channel, so as to obtain a matrix of estimated symbols sent. The matrix of estimated symbols sent is then multiplied by the de-precoding matrix.

Indeed, the implementation of a MIMO system, comprising a plurality of transmit antennas and a plurality of receiver antennas, induces the existence of different transmit antenna/receiver antenna paths on which it is possible to transmit the payload information, where these different paths can be schematically represented by a channel matrix.

In reception, the channel encoding estimated on the different paths must be inverted in order to retrieve the symbols sent. Assuming that the channel is perfectly known to the receiver, it is enough to carry out an inversion of the channel matrix.

The reception method especially comprises a preliminary step of detection of the M transmit antennas implementing a successive cancellation algorithm.

In a second embodiment, with the sent signal being conveyed between the M transmit antennas and the P receiver antennas by a transmission channel, the de-precoding matrix is an inverse matrix of a total matrix associating the matrix of the channel and the linear precoding matrix.

In this embodiment, the reception method implements a decoding with ordering, which enables a priority decoding of the channels having the best signal-to-noise ratio.

In this case, the de-precoding matrix is determined by implementation of a Cholesky decomposition algorithm, which can be used to obtain a decoding method that costs little in computation and is less complex than the prior art techniques.

The maximum likelihood type techniques are well known and satisfactory but complex.

For the decoding of MIMO systems, the use of a Cholesky decomposition with a minimum mean square error (MMSE) criterion is totally novel and can be used to resolve this drawback of complexity inherent in prior-art techniques.

One alternative to the Cholesky decomposition would be to use a QR decomposition with the ZF criterion. This technique also has low complexity but shows less satisfactory results.

According to one variant of the invention, with the de-precoding matrix being a block matrix, the reception method carries out a distance minimization by change of symbol in a block. This further improves the decoder of an embodiment of the invention.

An embodiment of invention also relates to a signal formed by vectors sent successively on M transmit antennas, where M is greater than or equal to 2, the M symbols of each vector being distributed on the M antennas. According to an embodiment of the invention, the vectors are precoded vectors corresponding to columns of a precoded matrix obtained by taking the matrix product of a linear precoding matrix and a source matrix, formed by source vectors each comprising N source symbols to be sent, the source vectors being organized in said source matrix in successive rows.

An embodiment of invention also relates to a device for sending a signal formed by vectors each comprising N source symbols to be sent, and implementing M transmit antennas, where M is greater than or equal to 2, for a sending method as described here above.

An embodiment of invention also relates to a device for the reception of a signal sent on M transmit antennas, where M is greater than or equal to 2, the device comprising P receiver antennas, where P is greater than or equal to 2.

Other features and advantages shall appear more clearly from the following description of a preferred embodiment, given by way of a simple illustrative and non-exhaustive example and from the appended drawings.

DETAILED DESCRIPTION OF ILLUSTRATIVE EMBODIMENTS

The general principle of an embodiment of the invention is based on a novel system of linear precoding, at the time of sending, for a multi-antenna system. A source matrix, formed by vectors to be sent arranged in successive rows is multiplied by a precoding matrix having a size greater than or equal to the number of transmit antennas, to form a precoded matrix. Each of the symbols forming a same column of the precoded matrix is then sent simultaneously on each of the transmit antennas, each antenna sending a different symbol from the column of the precoded matrix.

Figure 1:
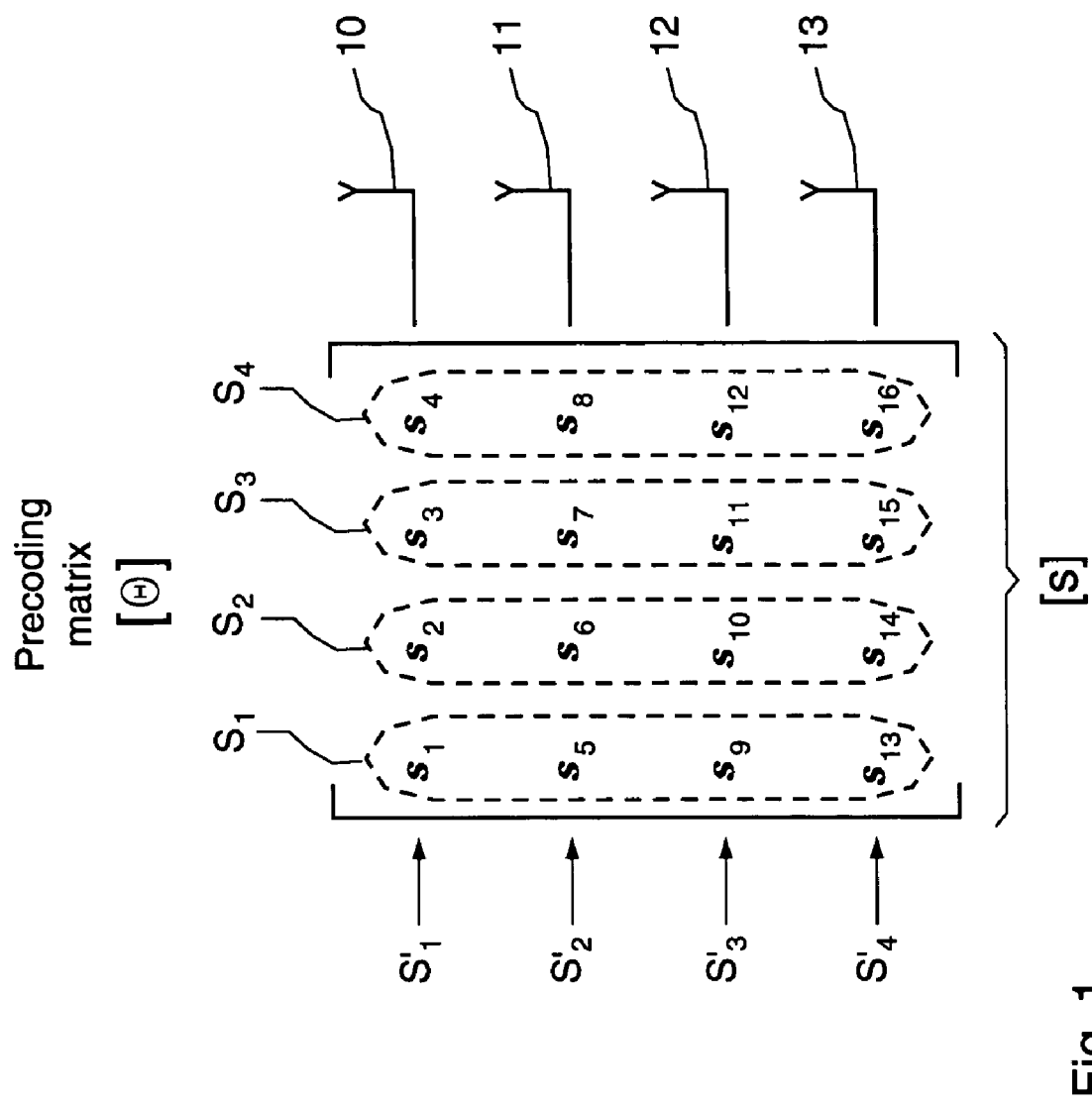
FIG. 1 illustrates a four-transmit-antenna system implementing a source matrix X and a precoding matrix Θ according to an embodiment of the invention.
Figure 1:
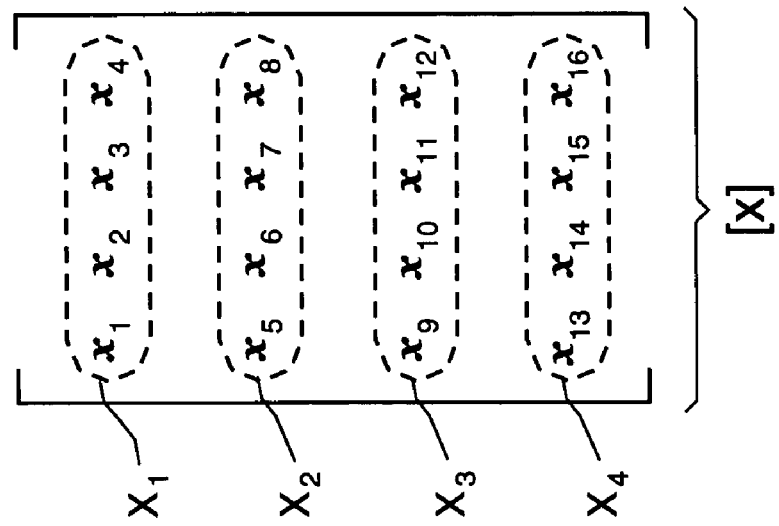

Referring now to FIG. 1, we present a system with four transmit antennas implementing a source matrix X and a precoding matrix $\Theta$ according to an embodiment of the invention.

For the sake of simplification, the description here and further below in the document is limited to the particular case of a square source matrix X and a square precoding matrix $\Theta$.

Those skilled in the art will have no difficulty in extending this teaching to all types of matrices X and $\Theta$, it being understood that the number of columns of X should be equal to the number of rows of $\Theta$, and that X must have M rows, where M is the number of transmit antennas.

The source matrix X, which comprises the information to be transmitted, is formed by four vectors $X_1$, $X_2$, $X_3$, $X_4$, forming the rows of the matrix X.

Each vector $X_i$, for i=1 to 4, is formed by four symbols: $X_1=[x_1\ x_2\ x_3\ x_4]$, $X_2=[x_5\ x_6\ x_7\ x_8]$, $X_3=[x_9\ x_{10}\ x_{11}\ x_{12}]$, $X_4=[x_{13}\ x_{14}\ x_{15}\ x_{16}]$.

The total number of symbols to be sent is therefore 16. This corresponds to the number of transmit antennas M multiplied by the number L of rows of the precoding matrix $\Theta$.

The precoding matrix $\Theta$ is sized 4×4. It is a block matrix. According to one particular embodiment, the precoding matrix $\Theta$ is the following:

$$\Theta_L = \sqrt{\frac{2}{L}} \cdot \begin{bmatrix} \Theta_{L/2} & \Theta_{L/2} \\ \Theta_{L/2} & -\Theta_{L/2} \end{bmatrix}^T$$

with $\Theta_2 = \begin{bmatrix} e^{i\theta_1}\cos\eta & e^{i\theta_2}\sin\eta \\ -e^{-i\theta_2}\sin\eta & e^{-i\theta_1}\cos\eta \end{bmatrix}$ and $\eta = \frac{\pi}{4} + k\frac{\pi}{2}$, $\theta_2 = \theta_1 - \frac{\pi}{2}$, and for $i \in [1,2]$, $$\theta_i = \frac{\pi}{4} + k'\frac{\pi}{2}$$

where k, k' are relative integers.

After multiplication of the source matrix X by the precoding matrix $\Theta$, a precoded matrix S is obtained (S=X.$\Theta$).

The matrix S, sized 4×4, is formed by four vectors $S_i$ (i=1 to 4): $S_1=[s_1\ s_5\ s_9\ s_{13}]$, $S_2=[s_2\ s_6\ s_{10}\ s_{14}]$, $S_3=[s_3\ s_7\ s_{11}\ s_{15}]$, $S_4=[s_4\ s_8\ s_{12}\ s_{16}]$.

These vectors $S_i$, also called precoded vectors, correspond to the multiplication of the source matrix X by a same column of the precoding matrix $\Theta$. Thus, $S_1$ corresponds to the vector obtained by the multiplication of the source matrix X by the first column of the precoding matrix $\Theta$, $S_2$ corresponds to the vector obtained by the multiplication of the source matrix X by the second column of the precoding matrix $\Theta$, and so on and so forth for the four columns of the matrix $\Theta$.

At a given point in time, each of the four transmit antennas 10, 11, 12 and 13 then sends one of the symbols of the same precoded vector $S_i$ in the same sending burst.

Thus, at an instant T0, the first antenna 10 sends the symbol $s_1$ of the vector $S_1$. Substantially at the same instant T0, the second antenna 11 sends the symbol $s_5$ of the vector $S_1$, the third antenna 12 sends the symbol $s_9$ of the vector $S_1$ and the fourth antenna 13 sends the symbol $s_{13}$ of the vector $S_1$.

The other precoded vectors $S_2$, $S_3$ and $S_4$ are respectively sent in three sending bursts corresponding to the times T1, T2 and T3.

Each of the symbols of a same precoded vector corresponding to the multiplication of a source matrix X by a same column of a precoding matrix $\Theta$ is then sent on each of the transmit antennas, each antenna sending a different symbol of the precoded vector.

In other words, if the matrix S is deemed to be formed by four vectors $S_1'$, $S_2'$, $S_3'$ $S_4'$ organized in successive rows, i.e. $S_1'=[s_1\ s_2\ s_3\ s_4]$, $S_2'=[s_5\ s_6\ s_7\ s_8]$, $S_3'=[s_9\ s_{10}\ s_{11}\ s_{12}]$, $S_4'=[s_{13}\ s_{14}\ s_{15}\ s_{16}]$, then:

the first symbols of each vector $S_i'$ (for i=1 to 4) are sent on the different transmit antennas simultaneously, $s_1$ on the first antenna and $s_{13}$ on the last antenna;

the second symbols of each vector $S_i'$ are sent on the different transmit antennas simultaneously, $s_2$ on the first antenna and $s_{14}$ on the last antenna;

this operation is repeated until the last symbols of each vector $S_i'$.

Finally, the system transmits first of all $[s_1\ s_5\ s_9\ s_{13}]$ at an instant T0, then $[s_2\ s_6\ s_{10}\ s_{14}]$ at T1, then $[s_9\ s_7\ s_{11}\ s_{15}]$ at T2, and finally $[s_4\ s_8\ s_{12}\ s_{16}]$ at T3.

Figure 2A:
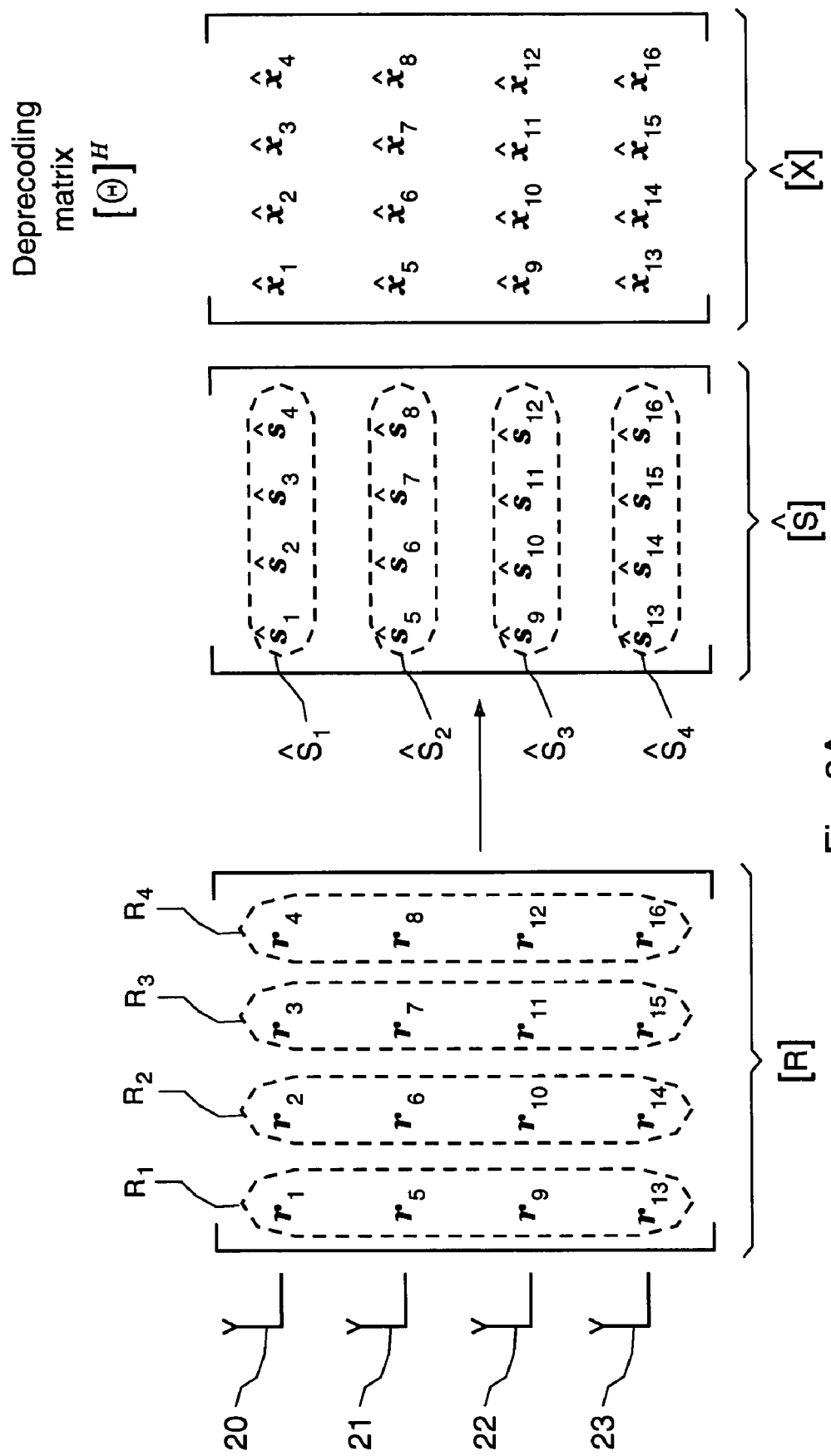
FIG. 2A presents a system with four antennas for the reception of a signal sent according to the system of FIG. 1, in a first embodiment of the invention known as an embodiment without ordering (without "sequencing")
Figure 2B:
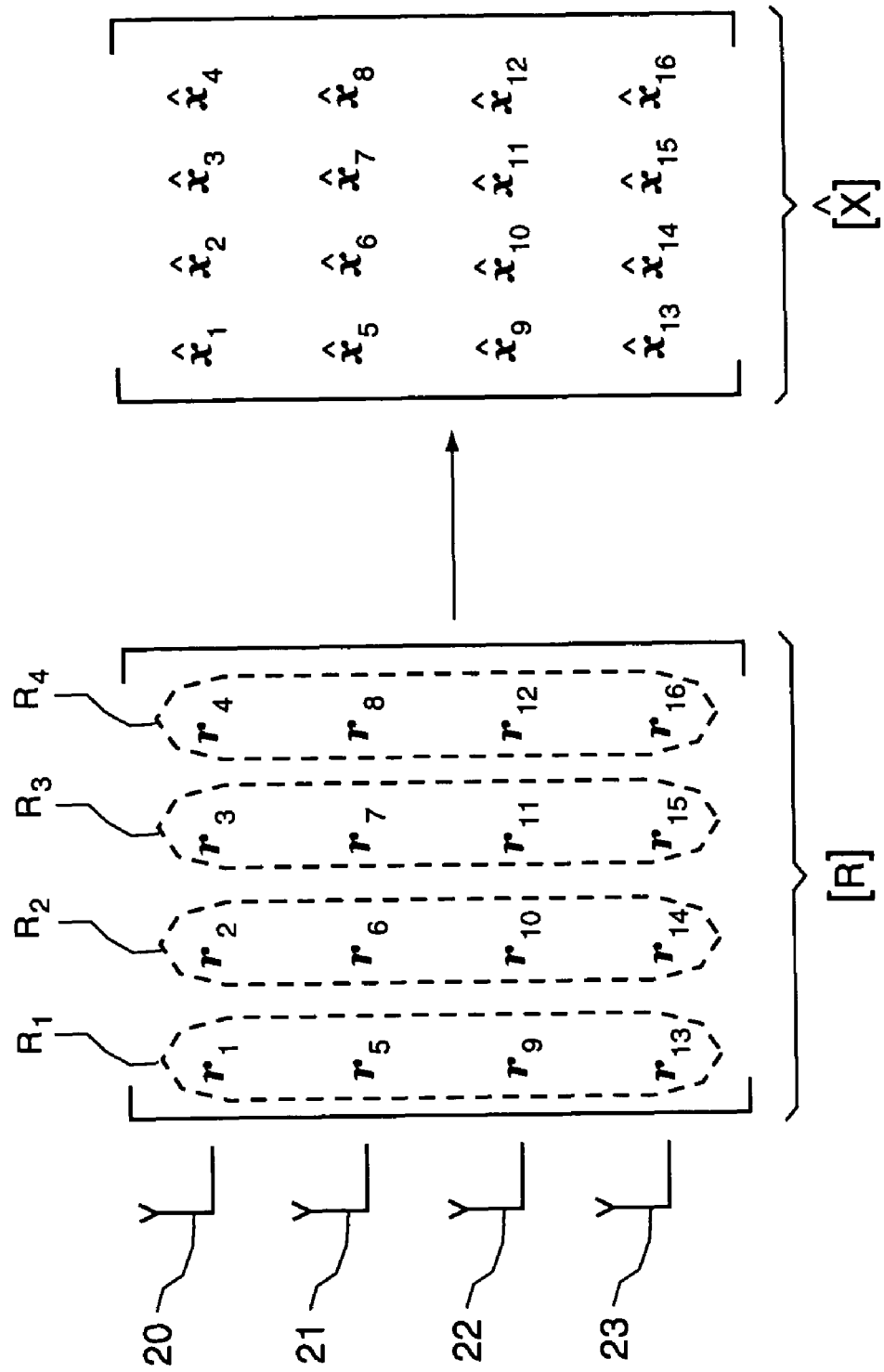
FIG. 2B presents a system with four antennas for the reception of a signal sent according to the system of FIG. 1, in a second embodiment of the invention known as an embodiment with ordering (sequencing)

Referring now to FIGS. 2A and 2B, we present a system with four receiver antennas.

After transmission in the MIMO channel, the received signals are constituted by vectors $R_i$ (for i=1 to 4) organized in successive columns in a reception matrix R, where $R_1=[r_1\ r_5\ r_9\ r_{13}]$, $R_2=[r_2\ r_6\ r_{10}\ r_{14}]$, $R_3=[r_3\ r_7\ r_{11}\ r_{15}]$, $R_4=[r_4\ r_8\ r_{12}\ r_{16}]$.

Thus, the reception matrix R is formed by symbols $[r_1\ r_5\ r_9\ r_{13}]$ received substantially at the same instant T0', depending on the lengths each of the transmit antenna/receiver antenna paths, on the four receiver antennas ($r_1$ on the first antenna 20, $r_5$ on the second antenna 21, $r_9$ on the third antenna 22 and $r_{13}$ on the fourth antenna 23), the symbols $[r_2\ r_6\ r_{10}\ r_{14}]$ received substantially at the same point in time T1' on the four receiver antennas as described here above as well as symbols $[r_3\ r_7\ r_{11}\ r_{15}]$ and $[r_4\ r_8\ r_{12}\ r_{16}]$ received at the times T2' and T3'.

According to a first embodiment illustrated in FIG. 2A, the procedure is based on the technique known as a technique "without ordering". The technique starts first of all with the inverting of the coding channel estimated on the different transmit/receiver antenna channels so as to retrieve the estimated sent symbols.

Thus, a successive cancellation algorithm is implemented to detect the different transmit antennas.

This algorithm is the following:

$$r = sH$$

$$R_r = HH^H + \sigma^2 I$$

$$a = rH^H$$

$$b = R_r^{-1} a = \frac{sHH^H}{HH^H + \sigma^2 I}$$

with:
- r corresponding to the symbols received on the P receiver antennas, i.e. at the reception matrix R;
- H being the channel, with size (M×P);
- $\sigma^2$ being the mean signal-to-noise ratio of the receiver antennas;
- $R_r$ the self-correlation matrix;
- a corresponding to different vectors sized M according to the equation described here above;
- b corresponding first of all to the estimated values of the different symbol vectors sent [$s_1$ $s_5$ $s_9$ $s_{13}$], then to the estimates of the symbols sent [$s_2$ $s_6$ $s_{10}$ $s_{14}$], then to the estimated values of the symbols sent [$s_3$ $s_7$ $s_{11}$ $s_{15}$], and finally then to the estimated values of the symbols sent [$s_4$ $s_8$ $s_{12}$ $s_{16}$],
- the exponent $^H$ signifying conjugate transpose.

This algorithm is like a V-BLAST decoding as described in "Improving BLAST Performance using Space-Time Block Codes and Turbo Decoding", Globecom 2000, November 2000 (Baro, Bauch, Pavlic and Semmler) in the sense of the minimum mean square error (MMSE) by which it is possible to retrieve the estimated values $\hat{S}_i$ of the vectors $S_i$ sent for i ranging from 1 to 4.

This amounts to multiplying the reception matrix R by a matrix representing the inverse of the transmission channel.

The vectors received are then re-ordered so as to retrieve the estimated values of the vectors sent $S_1$, $S_2$, $S_3$, $S_4$ or again $S_1'$, $S_2'$, $S_3'$, $S_4'$, these estimated vectors being called $\hat{S}_1 = [\hat{s}_1\ \hat{s}_2\ \hat{s}_3\ \hat{s}_4]$, $\hat{S}_2 = [\hat{s}_5\ \hat{s}_6\ \hat{s}_7\ \hat{s}_8]$, $\hat{S}_3 = [\hat{s}_9\ \hat{s}_{10}\ \hat{s}_{11}\ \hat{s}_{12}]$ and $\hat{S}_4 = [\hat{s}_{13}\ \hat{s}_{14}\ \hat{s}_{15}\ \hat{s}_{16}]$ and being organized in successive rows in a matrix called a matrix of estimated symbols.

The receiver then multiplies the matrix of estimated symbols obtained $\hat{S}$ by a de-precoding matrix, to form a de-precoded matrix $\hat{X}$ used to extract an estimation of the source symbols sent. The de-precoding matrix corresponds to the conjugate transpose of the precoding matrix $\Theta$ used when sending (referenced $\Theta^H$ in FIG. 2A)

Since the precoding matrix $\Theta$ is unitary, multiplying the matrix of estimated symbols obtained $\hat{S}$ by the transposed and conjugate precoding matrix $\Theta^H$ amounts to multiplying the matrix $\hat{S}$ by the matrix $\Theta^{-1}$ that is the inverse of the precoding matrix $\Theta$: $\hat{X} = \hat{S}.\Theta^H = \hat{S}.\Theta^{-1}$.

The de-precoding step $\Theta^H = \Theta^{-1}$ is therefore performed at the level of each V-BLAST iteration.

In a second embodiment shown in FIG. 2B, the inversion of the channel encoding and the de-precoding operation are done in conjunction, in implementing a Cholesky decomposition algorithm. Such an algorithm is described especially by Wei Zha and Steven D. Blostein in "Modified Decorrelating Decision-Feedback Detection of BLAST Space-Time System" (ICC 2002, Vol. 1, pp. 335-339, April-May 2002). This technique is called a technique "with ordering".

In this embodiment, the receiver multiplies the reception matrix R, formed by the vectors $R_1 = [r_1\ r_5\ r_9\ r_{13}]$, $R_2 = [r_2\ r_6\ r_{10}\ r_{14}]$, $R_3 = [r_3\ r_7\ r_{11}\ r_{15}]$, $R_4 = [r_4\ r_8\ r_{12}\ r_{16}]$ organized in successive columns, by the inverse of a total matrix G, the matrix G corresponding to the association of the channel matrix and the precoding matrix $\Theta$.

The inverse of the total matrix G, also called a de-precoding matrix, is obtained by implementing a Cholesky decomposition within which an ordering operation is carried out.

The ordering operation makes it possible to take a decision first of all on the symbol of the total matrix G having the highest power. The symbols are thus processed in a decreasing order of power.

The Cholesky algorithm is the following:

$$R = X\Theta H$$

$$R_r = P_p(\Theta HH^H \Theta^H + \sigma^2 I)P_p^H$$

$$R_r = LL^H$$

$$R_r^{-1} = (L^H)^{-1} L^{-1}$$

$$x = RH^H \Theta^H P_p^H$$

$$y = x(L^H)^{-1}$$

$$z = P_p y L^{-1} = \frac{P_p X \Theta HH^H \Theta^H P_p^H}{P_p(\Theta HH^H \Theta^H + \sigma^2 I)P_p^H}$$

with:
- r corresponding to the symbols received at the P receive antennas, i.e. to the reception matrix R;
- X corresponding to the source matrix sent;
- $\Theta$ being the precoding matrix sized 4×4;
- H the channel matrix sized 4×4;
- $\sigma^2$ the mean signal-to-noise ratio of the receiver antennas;
- $R_r$ the self-correlation matrix;
- L the lower triangular matrix of the self-correlation matrix $R_r$;
- $P_p$ the permutation matrix according to a criterion of maximum power of the desired symbol on the interference of this self-correlation matrix;
- x and y are vectors sized 16 (the number of transmit antennas multiplied by the number of rows of the precoding matrix $\Theta$).

At reception, the Cholesky decomposition algorithm enables the receiver to directly obtain a vector z sized 16 (number of transmit antennas multiplied by the number of rows of the precoding matrix $\Theta$) corresponding to the estimation of the symbols sent by the source matrix X in a de-precoded matrix $\hat{X}$.

The Cholesky decomposition is a numerically stable decomposition.

In this embodiment, the advantage of the precoding is to decorrelate the channels if they are correlated.

Since the de-precoding matrix is a block matrix, the reception system may further be improved by using a technique of distance minimization by changing of symbols in a block.

Figure 3:
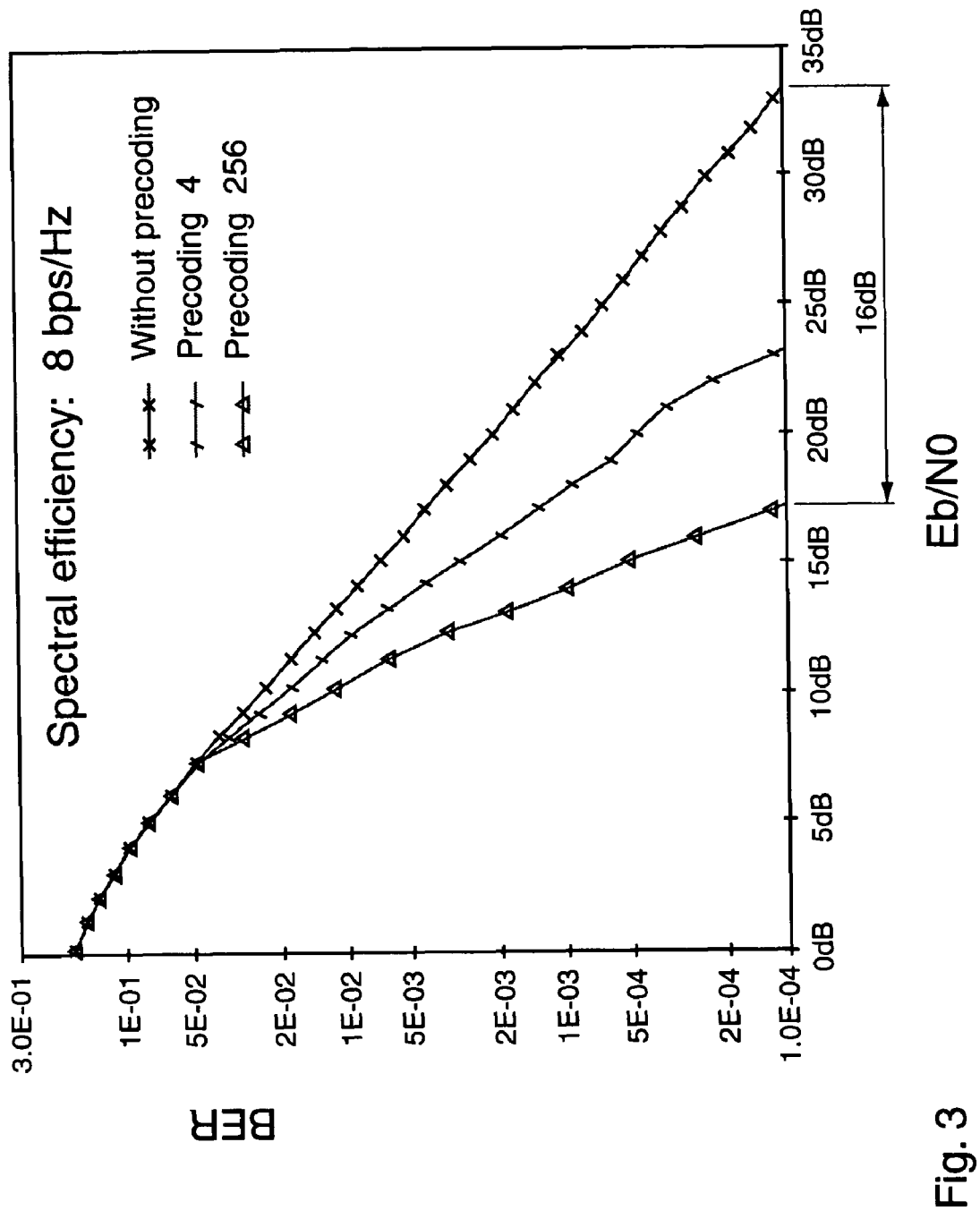
FIG. 3 describes the comparative performance of the different systems, namely the prior art system without linear precoding and the system of an embodiment of the invention with linear precoding for a precoding matrix sized four and a precoding matrix sized 256.

Referring now to FIG. 3, we present the performance levels obtained, according to an embodiment of the invention, by using a precoding matrix sized 4×4 and a precoding matrix sized 256×256.

More specifically, FIG. 3 illustrates the performance values of an embodiment of the invention according to the first embodiment without ordering, i.e. when the de-precoding matrix corresponds to the conjugate transpose of the precoding matrix: systems that use a linear precoding according to an embodiment of the invention are compared with a prior art system without precoding.

A gain of 16.0 dB can be observed between the reference curve, which corresponds to a system without precoding, and the curve with precoding 256, which corresponds to system using a precoding matrix sized 256×256, when the binary error rate (BER) is $10^{-4}$, with a spectral efficiency of 8 bps/Hz, when MMSE type equalizers are used at reception.

Thus, an embodiment of the invention improves performance with high signal-to-noise ratio while at the same time maintaining complexity in terms of $O(L^3)$, where L is the size of the precoding matrix, or again the number of rows of the precoding matrix if this matrix is not a square matrix.

For its part, the prior art approach of Ma and Giannakis ("Full-Diversity Full-Rate Complex-Field Space-Time Coding", IEEE Transactions on Signal Processing 2003), which also uses precoding matrices, cannot be used to obtain a precoding matrix sized 256 because the method would be far too costly in terms of computation. Indeed, the complexity of this approach is an exponential factor in terms of $O(M^L)$, where M corresponds to the size of the modulation.

The performance values of an embodiment of the invention are further improved when the second embodiment with ordering is implemented at reception.

Indeed, when this embodiment with ordering is implemented, a precoding matrix sized 4×4 gives results substantially identical to those obtained with a precoding matrix sized 256 in the embodiment without ordering, i.e. a gain close to 16.0 dB relative to a reference curve, which corresponds to a system without precoding when the binary error rate (BER) is $10^{-4}$, with a spectral efficiency of 8 bps/Hz.

With the performance of the system improving when the size of the precoding increases, very good results are obtained for a system with ordering and a precoding matrix sized 256×256.

Thus, an embodiment of the proposed invention enables a decoding that is less complex and less costly than with prior art techniques while at the same time showing improved performance.

Furthermore, the technique of an embodiment of the invention is suited to single-carrier modulation systems as well as to multiple-carrier modulation systems (OFDM or MC-CDMA systems for example).

It can be applied to any multi-antenna system that gives preference to the exploitation of capacity, achieving this result even if the multi-antenna channels are correlated.

An embodiment of the invention provides a technique for the multi-antenna sending and reception of a signal implementing a precoding matrix with better performance than that of prior art precoding systems.

An embodiment of the invention implements a technique of this kind having lower complexity and greater numerical stability than prior art techniques. More particularly, an embodiment of the invention provides a technique of this kind that does not necessitate space-time codes.

An embodiment of the invention implements a technique of this kind that is adapted to MIMO type multi-antenna systems for both single-carrier and multiple-carrier (OFDM and MC-CDMA) type modulations.

An embodiment of the invention provides a technique of this kind by which is possible to use the maximum capacity of the MIMO system and the maximum diversity of the system.

An embodiment of the invention implements a technique of this kind having improved binary error rate performance as compared with the prior art, while at the same time proposing a solution of the low complexity at reception.

An embodiment of the invention implements a technique of this kind that can be used to process correlated multi-antenna channels while limiting deterioration of performance and while not depending on modulation.

What is claimed is:

1. A method for sending a signal formed by vectors, each vector comprising N source symbols to be sent, and implementing M transmit antennas where M is greater than or equal to 2, the method comprising:

linearly precoding said signal, implementing a matrix product of a source matrix, formed by said vectors organized in successive rows, by a linear precoding matrix, delivering a precoded matrix, and sending precoded vectors corresponding to columns of said precoded matrix successively, wherein each precoded vector has M symbols, which have undergone a precoding by a same column of the linear precoding matrix and are distributed over said M antennas.

2. The method according to claim 1, wherein the precoding matrix comprises a block matrix.

3. The method according to claim 1, wherein the precoding matrix comprises a unitary matrix having a size greater than or equal to M.

4. The method according to claim 1, wherein the precoding matrix has the form:

$$\Theta_L = \sqrt{\frac{2}{L}} \cdot \begin{bmatrix} \Theta_{L/2} & \Theta_{L/2} \\ \Theta_{L/2} & -\Theta_{L/2} \end{bmatrix}^T$$

$$\text{with } \Theta_2 = \begin{bmatrix} e^{i\theta_1}\cos\eta & e^{i\theta_2}\sin\eta \\ -e^{-i\theta_2}\sin\eta & e^{-i\theta_1}\cos\eta \end{bmatrix}$$

$$\text{and } \eta = \frac{\pi}{4} + k\frac{\pi}{2}, \theta_2 = \theta_1 - \frac{\pi}{2},$$

and for $i \in [1,2]$, $$\theta_i = \frac{\pi}{4} + k'\frac{\pi}{2}$$

where k, k' are relative integers.

5. A method for receiving a signal sent on M transmit antennas where M is greater than or equal to 2, implementing P receiver antennas, where P greater than or equal to 2, wherein the method comprises:

receiving reception vectors on said P antennas, which are distributed by columns in a reception matrix, each reception vector comprises P received symbols distributed on said P receiver antennas and corresponding symbols having undergone a precoding by a same column of a linear precoding matrix at sending, processing said reception matrix, comprising multiplying by a linear de-precoding matrix representing the linear precoding matrix used at sending, so as to obtain a de-precoded matrix by which it is possible to extract an estimation of source symbols sent in the signal.

6. The method according to claim 5, wherein the de-precoding matrix is the conjugate transpose matrix of said precoding matrix.

7. The method according to claim 6, wherein said sent signal is conveyed between said M transmit antennas and said P receiver antennas by a transmission channel, said reception matrix is multiplied, during said processing, by a matrix representing the inverse of said transmission channel, so as to obtain a matrix of estimated symbols sent, and wherein said matrix of estimated symbols sent is then multiplied by the de-precoding matrix.

8. The method according to claim 6, wherein the method comprises a preliminary step of detecting said M transmit antennas implementing a successive cancellation algorithm.

9. The method according to claim 5, wherein said sent signal is conveyed between said M transmit antennas and said P receiver antennas by a transmission channel, and said de-precoding matrix is an inverse matrix of a total matrix associating the matrix of said channel and said linear precoding matrix.

10. The method according to claim 9, wherein said de-precoding matrix is determined by implementation of a Cholesky decomposition algorithm.

11. A method comprising:
    generating a signal comprising precoded vectors to be sent successively on M transmit antennas, where M is greater than or equal to 2, wherein the precoded vectors correspond to columns of a precoded matrix and each precoded vector has M symbols, which have undergone a precoding by a same column of the linear precoding matrix and are distributed on said M antennas,
    and wherein the precoded matrix is obtained by a matrix product of a linear precoding matrix and a source matrix, formed by source vectors each comprising N source symbols to be sent, said source vectors being organized in said source matrix in successive rows, and
    sending the signal.

12. A device for sending a signal formed by vectors each comprising N source symbols to be sent, and implementing M transmit antennas, where M is greater than or equal to 2, the device comprising:
    means of linearly precoding said signal, implementing a matrix product of a source matrix, formed by said vectors organized in successive rows, by a linear precoding matrix, delivering a precoded matrix, and
    means for successively sending precoded vectors corresponding to columns of said precoded matrix, wherein each precoded vector has M symbols, which have undergone a precoding by a same column of the linear precoding matrix and are distributed over said M antennas.

13. A device for receiving a signal sent on M transmit antennas, where M is greater than or equal to 2, said device comprising:
    P receiver antennas, where P is greater than or equal to 2,
    means of reception, on said P antennas, of reception vectors, and means of distribution by columns of said reception vectors in a reception matrix, wherein each reception vector comprises P received symbols distributed on said P receiver antennas and corresponding symbols having undergone a precoding by a same column of a linear precoding matrix at sending, and
    means of processing of said reception matrix, comprising means of multiplying by a linear de-precoding matrix representing the linear precoding matrix used at sending, so as to obtain a de-precoded matrix by which it is possible to extract an estimation of source symbols sent.

* * * * *